(12) United States Patent
Ganesch

(10) Patent No.: US 9,604,647 B2
(45) Date of Patent: Mar. 28, 2017

(54) METHOD FOR DETECTING A LACK OF DRIVER ACTIVITY AT THE STEERING WHEEL OF A MOTOR VEHICLE

(71) Applicant: Bayerische Motoren Werke Aktiengesellschaft, Munich (DE)

(72) Inventor: Dieter Ganesch, Munich (DE)

(73) Assignee: Bayerische Motoern Werke Aktiengesellschaft, Munich (DE)

(*) Notice: Subject to any disclaimer, the term of this patent is extended or adjusted under 35 U.S.C. 154(b) by 164 days.

(21) Appl. No.: 13/779,144

(22) Filed: Feb. 27, 2013

(65) Prior Publication Data

US 2013/0173085 A1 Jul. 4, 2013

Related U.S. Application Data

(63) Continuation of application No. PCT/EP2011/063100, filed on Jul. 29, 2011.

(30) Foreign Application Priority Data

Aug. 30, 2010 (DE) ........................ 10 2010 039 949

(51) Int. Cl.
*B60W 40/09* (2012.01)
*B60K 28/06* (2006.01)
*G08B 21/06* (2006.01)

(52) U.S. Cl.
CPC ............ *B60W 40/09* (2013.01); *B60K 28/06* (2013.01); *G08B 21/06* (2013.01); *B60W 2550/147* (2013.01); *B60Y 2400/305* (2013.01)

(58) Field of Classification Search
USPC ........ 701/36, 40, 41, 44, 45, 58; 340/426.31, 340/465, 575, 576; 180/272
See application file for complete search history.

(56) References Cited

U.S. PATENT DOCUMENTS 4,594,583 A * 6/1986 Seko et al. .................... 340/576
4,604,611 A * 8/1986 Seko et al. .................... 340/576
(Continued)

FOREIGN PATENT DOCUMENTS

CN 2548117 Y 4/2003
DE 37 32 782 A1 4/1989
(Continued)

OTHER PUBLICATIONS

German Search Report dated Aug. 8, 2011 w/partial English translation (ten (10) pages).

(Continued)

*Primary Examiner* — Rami Khatib
(74) *Attorney, Agent, or Firm* — Crowell & Moring LLP

(57) ABSTRACT

A method detects a lack of driver activity at the steering wheel of a motor vehicle. A moment imparted by hand to the steering wheel by the driver is repeatedly measured, and if in a plurality of successive measurements the magnitude of a value of the moment imparted by hand does not exceed a threshold value, a lack of driver activity is inferred. The magnitude of the threshold value is dependent on the surface condition, in particular on the degree of unevenness, of the roadway being traveled upon. The degree of unevenness of the roadway may be derived from a measured vertical acceleration in the wheel suspension of the vehicle or from deceleration and/or acceleration signals of at least one wheel of the vehicle.

9 Claims, 3 Drawing Sheets

(56) References Cited

U.S. PATENT DOCUMENTS

| | | | |
|---|---|---|---|
| 4,617,559 A * | 10/1986 | Slansky | 340/576 |
| 4,651,290 A | 3/1987 | Masaki et al. | |
| 4,794,536 A * | 12/1988 | Eto et al. | 701/41 |
| 5,487,006 A * | 1/1996 | Kakizaki et al. | 701/38 |
| 5,513,521 A * | 5/1996 | Klenk et al. | 73/114.04 |
| 5,745,031 A * | 4/1998 | Yamamoto | 340/439 |
| 7,455,146 B2 * | 11/2008 | Brosig et al. | 180/272 |
| 2009/0048737 A1 * | 2/2009 | Nakagoshi et al. | 701/43 |
| 2010/0017058 A1 * | 1/2010 | Lu et al. | 701/38 |
| 2010/0179764 A1 * | 7/2010 | Kuramori et al. | 702/19 |
| 2011/0022270 A1 * | 1/2011 | Tamaizumi et al. | 701/41 |
| 2011/0043350 A1 * | 2/2011 | Ben David | 340/441 |
| 2011/0301802 A1 * | 12/2011 | Rupp | G08G 1/0112 701/408 |

FOREIGN PATENT DOCUMENTS

| | | |
|---|---|---|
| DE | 34 21 253 C2 | 5/1993 |
| DE | 10 2005 014 237 A1 | 10/2006 |
| DE | 60 2004 012 105 T2 | 3/2009 |
| DE | 10 2008 021 150 A1 | 8/2009 |
| EP | 1 645 454 A1 | 4/2006 |
| EP | 1 997 666 A1 | 12/2008 |
| WO | WO 2009128466 A1 * | 10/2009 |

OTHER PUBLICATIONS

International Search Report dated Nov. 15, 2011 w/ English translation (four (4) pages).

Chinese Office Action dated Jun. 10, 2015, with English translation (Eleven (11) pages).

Chinese Office Action issued in counterpart Chinese Application No. 201180036169.7 dated Sep. 11, 2015, with partial English translation (Thirteen (13) pages).

* cited by examiner

METHOD FOR DETECTING A LACK OF DRIVER ACTIVITY AT THE STEERING WHEEL OF A MOTOR VEHICLE

CROSS REFERENCE TO RELATED APPLICATIONS

This application is a continuation of PCT International Application No. PCT/EP2011/063100, filed Jul. 29, 2011, which claims priority under 35 U.S.C. §119 from German Patent Application No. DE 10 2010 039 949.3, filed Aug. 30, 2010, the entire disclosures of which are herein expressly incorporated by reference.

BACKGROUND AND SUMMARY OF THE INVENTION

The invention relates to a method of detecting a lack of driver activity at the steering wheel of a motor vehicle, wherein the moment imparted by hand to the steering wheel by the driver is repeatedly measured, and in the event that in several successive measurements the amount of the magnitude of the moment imparted by hand does not exceed a threshold value, a lack of driver activity is inferred. With respect to the state of the art, reference is made, in particular, to German Patent document DE 10 2008 021 150 A1, and further in the course of the following description, to German Patent documents DE 34 21 253 C2 and DE 10 2005 014 237 A1.

In DE 10 2008 021 150 A1, the problem on which the present invention is also based is described in detail. This is, specifically, the ability to detect by use of an electronic control unit whether the driver of a vehicle equipped with a driver assistance system, and particularly with a driver assistance system that can automatically at least slightly steer the vehicle, is sufficiently attentive and, in particular, is capable of himself taking over the steering of the vehicle at any time. As the vehicle is moving along, the moment imparted on the steering wheel by the driver's hand will be measured, which can naturally only result in an amount unequal to zero if the driver at least touches the steering wheel. As long as the amount of the moment imparted by hand is significantly greater than zero, a sufficient driver activity can be inferred.

In the above-mentioned document, it is also described that, if no hand-imparted moment of a magnitude greater than zero is detected for only a brief time period, one does not immediately want to conclude that there is a lack of driver activity. DE 10 2008 021 150 A1 therefore describes a special method as to how, for a certain time period, the evaluation can advantageously take place with respect to the hand-imparted moment measured successively several times during that time. Naturally, other methods are also contemplated which may essentially lead to a comparable result, one of which will be briefly described together with the present invention.

However, the latter, specifically a different computing sequence or control sequence than that described in DE 10 2008 021 150 A1 is not the essential content of the present invention. It is rather the object of the present invention to further develop a method of detecting a lack of driver activity at the steering wheel of a moving motor vehicle such that the precision of the method will be further increased. As a result of the increased precision, a low number of false alarms because of an unnecessarily detected, only apparently lacking driver activity is to be set off, as well as, in cases in which there actually is no sufficient driver activity, such a lack of driver activity will be reliably detected in a timely manner.

This object is achieved by the following: should, in the case of a multiple successive falling-below a threshold value by current values of a magnitude of a moment imparted by hand, a lack of driver activity be inferred, the amount of the threshold value will be a function of the surface condition, particularly of the degree of unevenness, of the roadway traveled. Advantageous embodiments are described and claimed herein.

According to the invention, the threshold value, with which a, or the so-called, magnitude of a moment imparted by hand, which, for example or preferably, may be the amount of the measured moment imparted by hand, is compared, is not constant but depends on an essential marginal condition which is of a not negligible significance for an inference of a sufficient or lacking driver activity solely from the magnitude of the moment imparted by hand. According to the invention, the surface condition or the surface quality of the roadway should be considered, in which case the most essential influence factor when taking into account the road quality or the road condition, is the evenness or unevenness of the roadway. It was specifically recognized that, for a roadway which has the tendency to be uneven and, for example, has a plurality of cross-grooves and/or longitudinal grooves or fairly small potholes, for a determination of a sufficient driver activity, a moment imparted by hand should be required whose amount should be larger than when the vehicle is traveling on an absolutely even road, for example, formed by smooth asphalt. In the case of a good surface condition of the road that is also distinguished by a low level of unevenness, in particular, of small dimensions, a significantly lower threshold value for the magnitude of moments imparted by hand can therefore be set than in the case of a poor road condition which may be characterized, for example, by a plurality of fairly small or fairly large potholes. However, it is explicitly pointed out that the term "surface condition of the road" is not limited to the "unevenness" or "evenness" characteristic, but different threshold values may also be provided as a function of the coefficient of friction between the road and the wheels or tires of the vehicle. It is known that this coefficient of friction can be estimated with sufficient precision.

In principle, various possibilities exist for detecting the surface condition of the road. One possibility is an automatic optical analysis, for example, by analyzing camera images of the road, or by, for example, laser beam or ultrasound scanning; the latter also being included in the concept of optical analysis. However, basically further methods are also known, for the purpose of which reference is made to the documents mentioned at the outset. Thus, for example, a so-called degree of unevenness of the road can be derived from a measured vertical acceleration in the wheel suspension (for example, in the shock absorber) of the vehicle. As an alternative or in addition, it is also contemplated to derive the degree of unevenness of the road from deceleration and/or acceleration signals of at least one wheel of the vehicle, which can be obtained from the rotational wheel speeds. Within the scope of such an analysis, corresponding sensor signals can basically be subjected particularly to a low-pass filtering, and/or the signal noise can be evaluated. Independently of which method is used for detecting the road condition, the detected road condition can then be classified, and a threshold value for the magnitude of the moment imparted by hand can then be selected, which threshold value is assigned to this classification and with which the successively determined values of the magnitude of the moment imparted by hand are compared.

Such a comparison of successively determined values of the magnitude of the moment imparted by hand with the current threshold value preferably takes place for a certain time period while the vehicle is moving, so that, only if several successive measured values of the magnitude of the moment imparted by hand are below the relevant threshold value, a lack of driver activity is inferred. If, in contrast, a determined value of the magnitude of the moment imparted by hand exceeds a pertaining minimal value, preferably sufficient driver activity will be inferred and, as a result, a new series of successive measurements of the moment imparted by hand will be started, in which case the preceding measurements (before that measured value that has exceeded the minimal value) are not taken into account for the detection of a lack of activity. With the exceeding of the above-mentioned minimal value by a current value of the magnitude of the moment imparted by hand, a newly indicated time period is therefore triggered or started. Here, it should be explicitly pointed out that the mentioned time period does not have to be a firmly predefined duration but can also be set, for example, by a certain number of successive measurements of the moment imparted by hand. As far as the mentioned minimal value is concerned, the latter may be equal to the above-mentioned threshold value, or, as an alternative, differ from the latter. It may also be provided that sufficient driver activity can be inferred and therefore a new series of successive measurements of the moment imparted by hand can be started only if the magnitude of the moment imparted by hand continuously exceeds its assigned minimal value during a certain time period. This defined duration may be constant or variable; in the latter case, this duration may be a function of the surface condition of the traveled road. In addition, the above-mentioned minimal value that has to be exceeded so that a sufficient driver activity can be inferred may also be a function of the surface condition, particularly of the degree of unevenness of the traveled road.

According to an advantageous further development, the length of an above-mentioned time period within which several successive measurements of the moment imparted by hand are carried out before, in the event of a lasting falling below the threshold value, a lack of driver activity is inferred, and/or the length of the mentioned time period during which successive values of the magnitude of the moment imparted by hand have to exceed the minimal value so that a new series of successive measurements of the moment imparted by hand is started, may be depend on the driving speed of the vehicle. Normally, the time that elapses between a first and a second measurement of the moment imparted by hand will be constant and will be dependent on the clock pulse period of a CPU or the like provided in an electronic control unit in which the method according to the invention is implemented. During a longer time period, in which each measured magnitude of the moment imparted by hand has to be lower than the mentioned threshold value so that a lack of driver activity is inferred, a larger number of measured values of the moment imparted by hand is therefore considered than during a shorter time period. During a longer time period, it is therefore more probable that the driver actively operates the steering wheel during this time period and that a magnitude of the moment imparted by hand is therefore detected which exceeds the mentioned minimal value. Since, in the case of a lower driving speed of the vehicle, a brief inactivity of the driver naturally has a lower risk potential than at a higher driving speed of the vehicle, the above-mentioned time period, within which successively determined values of the magnitude of the moment imparted by hand are compared with a threshold value and in which case, when all values of the magnitude of the moment imparted by hand are below the threshold value within this time period, a lack of driver activity is inferred, may be longer at low driving speeds than at higher driving speeds of the vehicle.

For example, at a driving speed of 10 km/h, this mentioned time period may be in the order of 5 seconds and, at a driving speed of 40 km/h, may amount to only 2 seconds. A linear interpolation, for example, is also contemplated between these example values. It is also explicitly pointed out that, instead of a predefined time period, it may naturally also be predefined how many successive measured values of the moment imparted by hand or values of the magnitude of the moment imparted by hand derived therefrom have to be positively checked for a falling below the threshold value before a lack of driver activity can be inferred. Such a predefined number of measured values also may be variable, and particularly be a function of the driving speed of the vehicle and should therefore in the present case be included in the term "variable time period" or the time period dependent on the driving speed of the vehicle.

As mentioned above, the amount of the factually measured moment imparted by hand can be used as the above-mentioned magnitude of the moment imparted by hand. However, as an alternative, the use of the gradient of the moment imparted by hand, i.e. the time-related derivation of the moment imparted by hand or a use of the rate of change of the moment imparted by hand is also possible, as indicated in DE 10 2008 021 151 A1. A further increase of the precision of the method according to the invention can be achieved if, in addition to the amount of the moment imparted by hand as the first magnitude of the moment imparted by hand, the gradient of the moment imparted by hand is taken into account as a further, second magnitude of the moment imparted by hand. Only in the event that, in several successive measurements, the amount of the first magnitude of the moment imparted by hand does not exceed the first threshold value dependent on the road condition, and that the second magnitude of the moment imparted by hand does not exceed a second threshold value provided for this magnitude, will a lack of driver activity be inferred. In this case, the threshold value for the second magnitude of the moment imparted by hand may be constant or may also be a function of the road condition or of the surface condition of the traveled road.

When checking two (or more) different magnitudes of the moment imparted by hand with respect to falling below a respectively assigned threshold value within a predefined, preferably variable time period, preferably as early as when only one of these magnitudes of this moment imparted by hand exceeds its pertaining threshold value, a new series of successive measurements of the moment imparted by hand (and thereby with a new time period) will be started, so that the preceding measurements are not taken into account for the detection of a lack of driver activity. At this point, it should again be explicitly pointed out that it is not absolutely necessary to use a firmly predefined or variable time period for checking successive values of the magnitude(s) of the moment imparted by hand with respect to their threshold value. The number of successive measured values of the moment imparted by hand may rather also be defined, in which case, this predefined number may also be a function of the driving speed of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
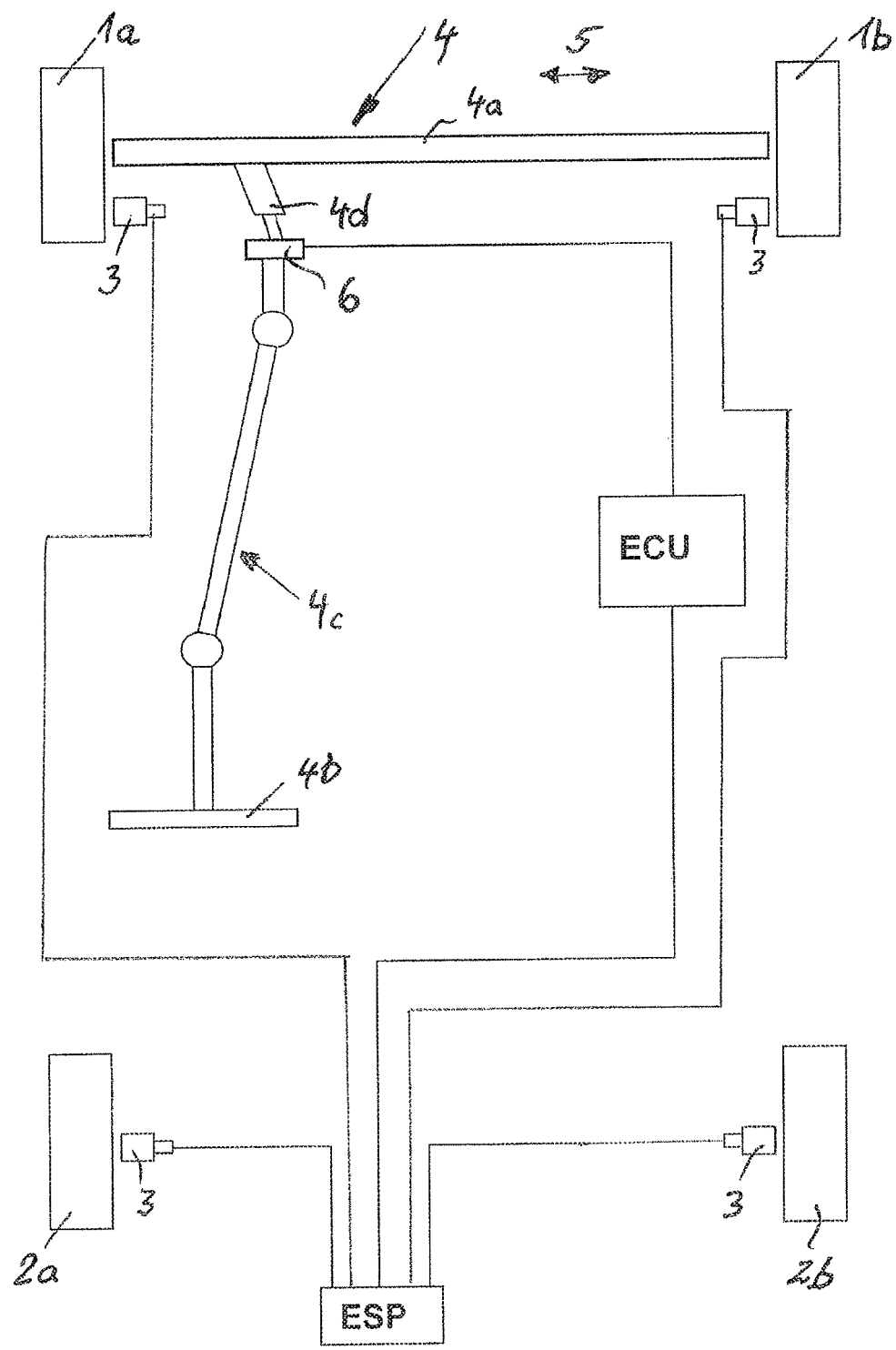
FIG. 1 is a simplified block diagram of a vehicle in which the method according to the invention may be carried out.

FIG. 1 is a very schematic view of the two steerable front wheels 1a and 1b as well as of the two rear wheels 2a and 2b of a vehicle. A rotational speed sensor 3 is assigned to each wheel 1a, 1b, 2a, 2b. Their sensor signals are fed to an electronic control unit ESP, in which, among others, an electronic vehicle stability program is implemented that is known to a person skilled in the art. The steerable front wheels 1a, 1b can be steered by way of a rack-and-pinion steering system 4, which is also known to a person skilled in the art and whose schematically illustrated steering rack 4a can be transversely displaced according to the direction of the arrow 5 in order to adjust a desired wheel toe at the front wheels 1a and 1b. The driver of the vehicle causes this transverse displacement of the steering rack 4a by way of his steering wheel 4b, which by way of a steering spindle 4c and a steering gear 4d, in which, for example, also an electric-motor-driven power assistance device may be integrated, correspondingly acts upon the steering rack 4a. A torque sensor 6 is integrated in the steering spindle 4c or another suitable element of the steering system 4, by which torque sensor 6, the moment or torque by which the driver holds or rotates the steering wheel 4b can be measured. In the following, this torque will also be called a "moment imparted by hand".

Figure 2C:
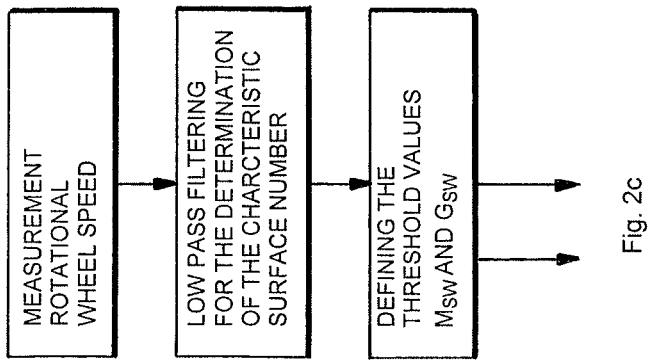
FIGS. 2a-2c are exemplary flow charts illustrating the continuous measurement of the moment imparted by a driver on a steering wheel, the measurement of driving speed, and the determination of a characteristic surface number representing wood roughness, respectively.
Figure 2B:
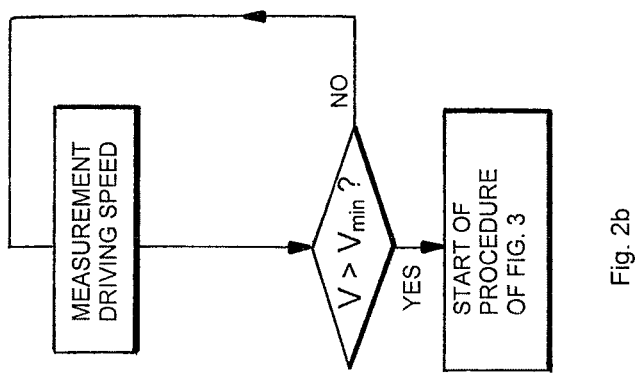
Figure 2A:
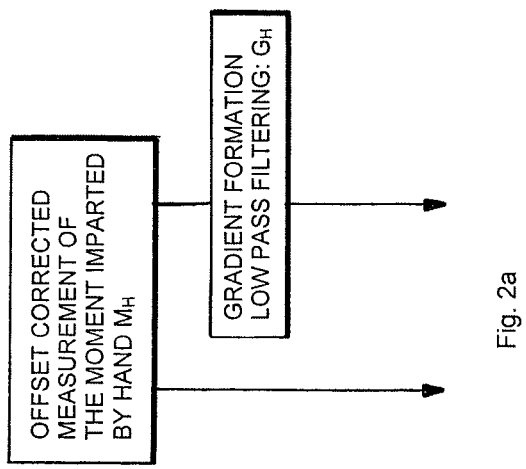

As illustrated in FIG. 2a, the amount of the moment imparted by hand to the steering wheel 4b, that is, of that torque by which the driver keeps a firm hold on the steering or rotates it at least slightly, is continuously measured. This measured value is offset-corrected, which results in a first magnitude of the moment imparted by hand $M_H$ used subsequently, and the so-called gradient of the moment imparted by hand is determined from this magnitude of the moment imparted by hand $M_H$ by derivation with respect to time. The high-frequency parts are removed from this last-mentioned signal by low-pass filtering, which results in a second magnitude of the moment imparted by hand $G_H$ used subsequently.

Parallel thereto, according to FIG. 2c, a characteristic surface number representing the roughness of the road and thus the surface condition of the road is determined from the rotational speeds of the vehicle wheels continuously measured by way of the rotational speed sensors 3 by low-pass filtering and further computing steps (in the present case in the control unit ESP), which characteristic surface number is characteristic of the quality of the currently present road section. This information is transmitted to a further electronic control unit ECU, in which the method according to the invention is implemented. By means of the current characteristic surface number, a threshold value $M_{SW}$ for the moment imparted by hand basically explained above for the first magnitude of the moment imparted by hand $M_H$ or a further (analogously basically already explained) threshold value $G_{SW}$ for the gradient of the moment imparted by hand or for the second magnitude of the moment imparted by hand $G_H$ are determined in the ECU. These threshold values $M_{SW}$ and $G_{SW}$ are stored as tables in the electronic control unit ECU as a function of the characteristic surface number.

Also parallel thereto, as shown in FIG. 2b, it is queried whether the driving speed v of the vehicle is above a minimal value $v_{min}$ because only above a low speed of, for example, 1.0 km/h does it have to be checked whether the driver is firmly holding the steering wheel or is controlling it. If the answer is in the affirmative, the control unit ECU will operate as illustrated in FIG. 3 and explained in the following.

Figure 3:
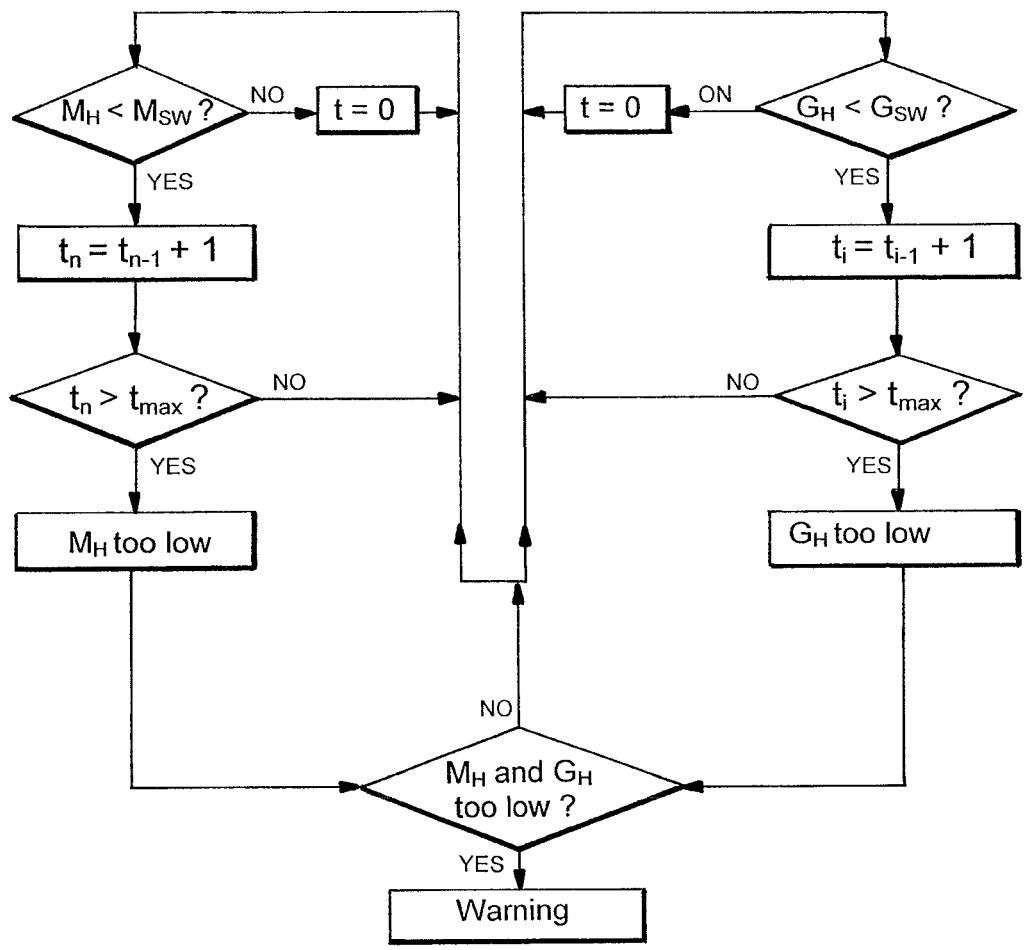
FIG. 3 is a flow chart illustrating an exemplary method according to the invention.

Referring to FIG. 3, from a point in time t=0, it is first checked in the circle shown on the left-hand side whether the first magnitude of the moment imparted by hand $M_H$ is smaller than the pertaining threshold value $M_{SW}$, and it is checked parallel thereto in the circle shown on the right-hand side whether the second magnitude of the moment imparted by hand $G_H$ is smaller than the pertaining threshold value $G_{SW}$. This checking may represent a quasi snapshot or may extend over a very brief time period of several fractions of a second. If the answers to these two parallel queries are negative; i.e. either when a moment imparted by hand $M_H$ is present that is greater than the pertaining threshold value $M_{SW}$ or a gradient of the moment imparted by hand $G_H$ is present that is greater than the pertaining threshold value $G_{SW}$, the respective timer $t_n$ (for the left-hand circle) or $t_i$ (for the right-hand circle) remains at the value t=0.

However, should at least one of these parallel queries have been answered or be answered in the affirmative, the respective timer $t_n$ or $t_i$ would be increased by one increment, whereupon it is checked whether the respective timer has already reached a maximal value $t_{max}$. If that is not so, it will be newly queried whether the first or second magnitude of a moment imparted by hand $M_H$ or $G_H$ is lower than the respective threshold value $M_{SW}$ or $G_{SW}$.

If a predefined maximal value $t_{max}$ for the timers was or is exceeded by the above-mentioned increase of one of the two timers $t_n$ or $t_i$, it will be determined that the pertaining magnitude of the moment imparted by hand ($M_H$ or $G_H$) is too low. It will then be checked whether the respective other magnitude of the moment imparted by hand (i.e. in that case, $G_H$ or $M_H$) is also too low. If the answer is in the affirmative, a warning is emitted which indicates that there is a reasonable inference that the driver is not holding the steering wheel 4b in a sufficiently firm manner. However, if the answer to the last-mentioned query is negative, the current monitoring will be continued as described.

Naturally, numerous modifications of the method described so far by way of the attached exemplary figures are contemplated, several possibilities being discussed above as to how these modification may be constructed. The detailed sequence of the method is also not to be incorporated into the claims but, as described in detail, it is claimed that at least one of the above-mentioned threshold values ($M_{SW}$ or $G_{SW}$) for one of the above-mentioned magnitudes of the moment imparted by hand ($M_H$ or $G_H$) is a function of the surface condition, particularly the degree of unevenness of the road or of the roughness of the road.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method of detecting a lack of driver activity at a steering wheel of a motor vehicle, the method comprising the acts of:
    determining, by an electronic control unit in the motor vehicle based on signals received from a rotational speed sensor of the motor vehicle, a characteristic surface number representing a degree of roughness of a road on which the motor vehicle is traveling;
    repeatedly measuring, by the electronic control unit based on signals received from a sensor coupled to the steering wheel, a moment imparted by hand to the steering wheel by a driver; and
    in an event that in several successive measurements a magnitude amount of the moment imparted by hand does not exceed a threshold value, inferring a lack of driver activity and emitting a warning to the driver indicating that the lack of driver activity has been inferred, wherein an amount of the threshold value increases as the degree of roughness of a road being traveled on increases.

2. The method according to claim 1, wherein the degree of roughness of the road is derived from a measured vertical acceleration in a wheel suspension of the vehicle.

3. The method according to claim 1, wherein the degree of roughness of the road is derived from at least one of deceleration and acceleration signals of at least one wheel of the vehicle.

4. The method according to claim 1, wherein:
    the amount of the measured moment imparted by hand is used as a first magnitude of the moment imparted by hand;
    a gradient of the moment imparted by hand is taken into account as a further magnitude of the moment imparted by hand; and only in an event that, in several successive measurements, the amount of the first magnitude of the moment imparted by hand does not exceed a first threshold value dependent on the degree of roughness as well as that the further magnitude of the moment imparted by hand does not exceed a second threshold value provided for said magnitude, is the lack of driver activity inferred.

5. The method according to claim 1, wherein a length of a time period within which several successive measurements of the moment imparted by hand are carried out before, in an event of a lasting falling below the threshold value, a lack of driver activity is inferred, is a function of the driving speed of the vehicle.

6. The method according to claim 4, wherein, in an event that at least one of possible considered magnitudes of the moment imparted by hand exceeds an assigned minimal value, a new series of successive measurements of the moment imparted by hand is started, so that preceding measurements are not taken into account for detecting the lack of driver activity.

7. The method according to claim 6, wherein a new series of successive measurements of the moment imparted by hand is started only if one of the magnitudes of the moment imparted by hand continuously exceeds its assigned minimal value during a defined time period.

8. The method according to claim 6, wherein at least one of an amount of the minimal value and an amount of the defined time period is a function of the degree of roughness of the road.

9. The method according to claim 7, wherein at least one of an amount of the minimal value and an amount of the defined time period is a function of the degree of roughness of the road.

* * * * *